United States Patent [19]

Ten Broeck et al.

[11] Patent Number: 4,849,772

[45] Date of Patent: Jul. 18, 1989

[54] INK JET PRINTER WITH FRONT REFERENCE PLATEN ASSEMBLY

[75] Inventors: Dirk P. Ten Broeck, Milford; Robert C. Aviles, Merrimack, both of N.H.

[73] Assignee: Dataproducts Corporation, Woodland Hills, Calif.

[21] Appl. No.: 167,887

[22] Filed: Mar. 14, 1988

[51] Int. Cl.[4] ............................................ G01D 15/24

[52] U.S. Cl. ................................ 346/139 R; 400/618; 346/134

[58] Field of Search ........................ 400/48, 29, 27, 28, 400/618, 56; 346/139 R, 134

[56] References Cited

U.S. PATENT DOCUMENTS 4,527,921 7/1985 Koizuma ............................ 400/618

4,751,527 6/1988 Oda .................................... 346/134

*Primary Examiner*—E. A. Goldberg

*Assistant Examiner*—Mark Reinhart

*Attorney, Agent, or Firm*—Spensley Horn Jubas & Lubitz

[57] ABSTRACT

An ink jet printer having an ink jet printing device for printing characters in a printing region on a surface of a substrate, the device being constructed to effect optimum printing at a predetermined distance from the device, and a device for holding a substrate having a surface which is to be printed upon in printing position relative to the printing device, the holding device including a referencing plate having a reference surface which lies in a plane which extends past the printing device at the predetermined distance therefrom, and the holding device further including a leaf spring mounted to bear against the side of the substrate opposite the surface to be printed upon for pressing the surface to be printed upon against the reference surface of the referencing plate.

11 Claims, 1 Drawing Sheet

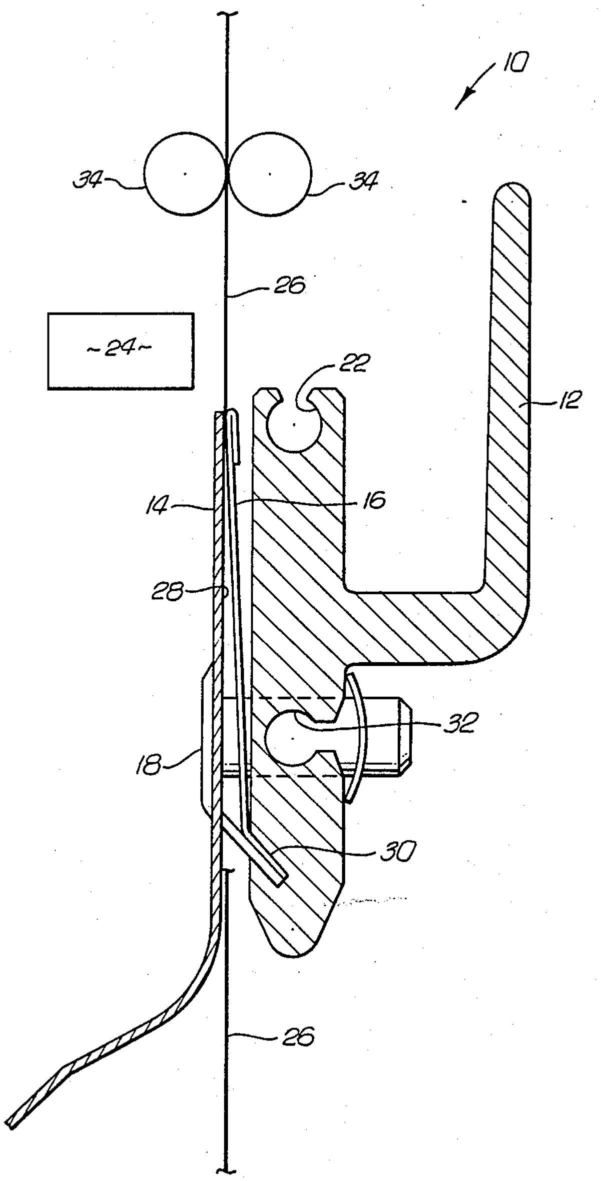
10
34
34
26
~24~
22
12
14
16
28
32
18
30
26

INK JET PRINTER WITH FRONT REFERENCE PLATEN ASSEMBLY

BACKGROUND OF THE INVENTION

1. Field of the Invention

The present invention relates generally to a platen head assembly in an ink jet printer and, more specifically, to means for adjusting the relative position between a substrate, composed of a paper sheet, and the print head.

2. Description of the Related Art

Impact printers such as the daisy wheel, dot matrix or wire matrix have proven to be very reliable in the field of high speed printing devices. An example of an impact printer of the wire matrix type is disclosed in Bader, U.S. Pat. No. 4,088,215. In this type of printer, letters, numbers and symbols are formed from a series of dots produced by the impact of the ends of a plurality of wire elements or keys on a substrate. The wire elements forcefully strike the substrate, thus requiring a backstop for the moving element to position and support the substrate. Generally the backstop comprises a platen disposed within the printing system and so arranged to position the substrate between itself and the character keys.

A platen which is fixed relative to the printing unit is known as a rear referencing platen; a platen which is associated with a member which places the substrate surface that faces the printing unit at a fixed distance from the printing unit is known as a front referencing platen.

Ink jet printers wherein the ink within the print head is of the solid-ink or phase-change type, which may also be referred to as hot melt ink, are also presently in use. The phase change or hot melt ink of the type utilized in an ink jet is characteristically solid at room temperature. When heated, however, the ink changes to a liquid state and is propelled onto the substrate in a desired character pattern. The ink thereafter solidifies on the substrate in the prescribed pattern. Although, with ink jet printer systems, there is no physical contact between the print head and the substrate, rear referencing of the platen has hitherto been utilized.

Regardless of whether an impact printer or an ink jet printer is utilized, it is generally desirable to maintain a constant distance or print head gap between the substrate surface and the character keys or print head. Although the gap distance is important in impact printer systems, it is critical in ink jet printers, and especially when utilizing solid ink or phase change ink. For example, if the print head gap, generally defined as the distance between the ejection nozzle and the substrate, is initially set for a particular substrate thickness, a thinner substrate material would create a larger print head gap and a thicker substrate material would result in a smaller print head gap. A print head gap which is not properly adjusted can result in print characters which are virtually impossible to distinguish. For example, if the substrate is positioned too close to the ink jet head the liquid ink may solidify in illegible blotches due to its coming in contact with the substrate too soon. If the print head is too far away from the substrate the spray pattern will generally be too large and the characters formed will not legible.

In printer systems where the thickness of the substrate could vary, such as when a sheet of paper of one thickness is printed and thereafter it is necessary to print on an envelope of a different thickness, or in other situations, some mechanism for moving the platen to maintain the desired print head gap is usually provided.

It is therefore important, in those cases in which a plurality of different thicknesses of substrate may be printed upon, to provide a compensating device which acts to maintain the same relative distance between the print head and the surface of the substrate regardless of changes in the thickness of the substrate. Various such compensation devices are known in the prior art.

For example, Bader, U.S. Pat. No. 4,088,215 discussed above, discloses a mechanism for adjusting the print head to substrate distance by moving the platen relative to the print head. The Bader device operates by utilizing electronic circuitry including a Hall effect transducer, voltage comparators, and sensing means to measure the gap distance and mechanically adjust the position of the platen.

In Liles, U.S. Pat. No. 3,750,792, the print head is movable toward and away from the fixed platen, under the influence of a sensing finger, to maintain the desired print head - substrate distance.

One example of a front referencing platen associated with a dot matrix printer is disclosed in Manriquez, U.S. Pat. No. 4,227,819. The Manriquez patent discloses a free floating platen which is adjustable to accommodate variations in substrate thickness. To make adjustments, the platen itself is mechanically disconnected from the printing system and reoriented commensurate with the orientation of the lower surface of the substrate.

Another example of such a platen is disclosed in Kurihira, et al., U.S. Pat. No. 4,143,977. The Kurihira et al. patent discloses an adjustable platen comprising a plurality of separate platen units disposed longitudinally along the print line of the substrate. The adjustable units individually engage the substrate at different points to compensate for thickness variations across the length of the substrate. The individual adjustable platen units are connected to actuating arms which move the platen units under operator control to bias the substrate toward a guide plate through the utilization of leaf springs and tension springs.

Further examples of platens of this type are described in Kwan et al, U.S. Pat. No. 3,912,068; Polit, U.S. Pat. No. 4,620,807; Kurihira, et al., U.S. Pat. No. 4,184,780; and Lawter, et al., U.S. Pat. No. 4,422,782. These and the previously described devices for adjusting the platen position to maintain a constant gap distance each require complex mechanisms with multiple moving parts.

The front referencing arrangements described above all employ relatively complicated mechanisms for positioning the substrate and include some form of backing plate which supports the substrate directly in line with the print head. As a result, they add significantly to the manufacturing and maintenance costs of the printers in which they are installed.

SUMMARY OF THE INVENTION

It is therefore an object of the present invention to provide an ink jet printer with a platen assembly which maintains a constant printing gap without a complex mechanism.

It is a further object of the present invention to provide a platen assembly which is simple in construction, highly reliable in operation and easy and inexpensive to manufacture.

It is a still further object of the invention to provide a platen assembly for use with ink jet printer systems.

These and other objects of the present invention are achieved by an ink jet printer provided with a platen assembly which comprises a front reference plate which is fixedly mounted to a frame and a rear paper depressor constituted by a leaf spring mounted to the frame in a position behind the front reference plate for holding the substrate securely against the front reference plate. The substrate is inserted between the front reference plate and the rear paper depressor with the substrate surface facing the print head.

The present device maintains the substrate surface at a desired print gap distance independent of substrate thickness. The substrate extends beyond the length of the front reference plate since there is no requirement that the reference plate act as a back stop for the print head.

BRIEF DESCRIPTION OF THE DRAWINGS

These and other objects, features and advantages of the present invention will become more apparent from the following description, when taken in conjunction with the accompanying drawings, in which:

The sole FIGURE is a cross-sectional side view of a preferred embodiment of a front referencing platen assembly according to the invention.

DESCRIPTION OF THE PREFERRED EMBODIMENTS

The following detailed description is of the best presently contemplated mode of carrying out the invention. This description is not to be taken in a limiting sense, but is made merely for the purpose of illustrating the general principles of the invention. The scope of the invention is best defined by the appended claims.

The present invention recognizes that due to the nature of an ink jet printer system, there is no requirement that a platen or reference plate be utilized as a back stop at the printing location. Therefore, in accordance with the present invention, a front referencing plate is positioned between the ink jet printing device and the substrate. Referring now to FIG. 1, there is shown an embodiment of the present front referencing platen assembly 10. As shown, the preferred construction of the present device includes a known mounting frame 12 which is adaptable for mounting in a fixed position in a printer (not shown).

A frame having the configuration of frame 12 is employed in a Dataproducts Model SI480 printer, the illustrated embodiment being intended for installation in that printer. The invention can be applied to any ink jet printer having, or capable of being equipped with, a support body located in the vicinity of the printing device nozzle plate and fixed in position relative to the substrate printing plane.

Fixedly mounted with respect to frame 12 is a front reference plate 14 and a rear paper depressor 16. The front reference plate 14 is interposed between printing device 24 and mounting frame 12. Rear paper depressor 16 is mounted between frame 12 and front reference plate 14 and is operable to securely position and support a substrate 26 against the rear surface 28 of front reference plate 14. The substrate, when positioned between rear paper depressor 16 and front reference plate 14, extends above front reference plate 14 and across the printing region of device 24, with the substrate surface to be printed on facing device 24.

Front reference plate 14 may be constructed from rigid sheet metal and is generally dimensioned to be at least coextensive with the widest substrate to be received by the printer to provide support for the entire substrate. Rear paper depressor 16 is a leaf spring which is normally held in compression contact with the rear surface 28 of front reference plate 14.

In accordance with the invention, depressor 16 is constituted exclusively by the leaf spring, resulting in an extremely simple, reliable and inexpensive substrate positioning arrangement.

Printing device 24, and particularly its nozzle plate, is located only a short distance above the upper edge of plate 14, preferably as close to the upper edge of plate 14 as possible, and the free end of depressor 16, which bears against the rear surface of substrate 26, is preferably located in line with the upper edge of plate 14. These measures assure that the substrate surface to be printed upon will be positioned at the desired distance from the nozzle plate of device 24 without any support structure being required behind substrate 26 in the region opposite device 24.

The mounting frame 12 may be provided, as shown, with mounting sockets such as 22, 32 which cooperate with mounting members such as clips 20 which may be disposed within the printer (not shown) for securely positioning the front referencing platen assembly within the printer system. Elements 20, 22 and 32 are provided in the abovecited printer.

As shown, the leaf spring constituting depressor 16 is folded over at its free edge to have enhanced rigidity and to provide a uniform pressure against the substrate rear surface.

Plate 14 is supported on frame 12 by two mounting brackets 18 disposed to the sides of the region across which a substrate can extend. Each bracket 18 may be welded or otherwise fixed to one lateral edge of plate 14 and is secured in a slot 30 provided in frame 12. In addition, depressor 16 is secured, via the edge remote from its free edge, in slot 30. Thus, the entire substrate positioning arrangement can be installed in a simple and inexpensive manner.

During printing, substrate 26 may be advanced for the printing of successive lines by any conventional substrate feeding arrangement. This may include, as shown in the FIG., a pair of support and drive rollers 34 located downstream, with respect to the direction of substrate feed, from device 24. Alternatively, or in addition, a similar pair of rollers can be disposed below plate 14, i.e. upstream from device 24, and/or tractors can be provided upstream and/or downstream from device 24.

In operation, substrate 26 is fed along paper path 30 into position between rear paper depressor 16 and front reference plate 14. The free edge of rear paper depressor 16 is deflected by substrate 26 away from surface 28 of front reference plate 14 toward frame 12 to accommodate thin or thick substrates equally well. However, because front reference plate 14 is fixedly mounted at the desired position, the front substrate surface is maintained at the desired distance from the nozzle plate of device 24 independently of the inserted substrate thickness. The distance between the rear surface 28 of front reference plate 14 and frame 12 can be selected during manufacture to provide space for the rear paper depressor to yield to accommodate the thickest expected substrate.

With the present construction, unlike prior art ink jet printer platen assemblies, there is no need to monitor and adjust the print head gap each time the substrate is positioned. Therefore, there is no need to employ complex mechanisms and devices to adjust the relative position of the reference plate to maintain or obtain a desired print head gap distance.

The present disclosed embodiment is to be considered in all respects as illustrative, and not restrictive, the scope of the invention being indicated by the appended claims, rather than the foregoing description, and all changes which come within the meaning and range of equivalency of the claims are therefore intended to be embraced therein.

What is claimed is:

1. In an ink jet printer having an ink jet printing device for printing characters in a printing region on a surface of a substrate, the device being constructed to effect optimum printing at a predetermined distance from the device, and means for holding the substrate with the surface which is to be printed upon in printing position relative to the device, the holding means including a front referencing plate having a reference surface which is oriented to face the substrate surface which is to be printed upon and which lies in a plane which extends past the printing device at the predetermined distance therefrom, the improvement wherein said holding means further comprise a leaf spring mounted in said holding means to bear against the side of the substrate opposite the substrate surface to be printed upon for pressing the substrate surface to be printed upon against the reference surface of said referencing plate.

2. A printer as defined in claim 1 wherein said referencing plate and said leaf spring are spaced from the printing region along the plane and are located completely to one side of the printing region.

3. A printer as defined in claim 2 wherein said referencing plate has a boundary edge located adjacent the printing region.

4. A printer as defined in claim 3 wherein said leaf spring has a free edge substantially coextensive with said boundary edge of said referencing plate, and said leaf spring is mounted to permit resilient movement of said free edge of said leaf spring transversely to said reference surface.

5. A printer as defined in claim 4 wherein said leaf spring is folded over at its said free edge.

6. A printer as defined in claim 1 further including a support member mounted in a fixed position in the printer and wherein said referencing plate and said leaf spring are fixedly supported by said support member.

7. A printer as defined in claim 6 wherein said leaf spring is directly supported by said support member and said support member comprises support arms directly supporting said referencing plate in a manner to permit a substrate to be inserted between said referencing plate and said leaf spring for movement along said reference surface and through the printing region.

8. A printer as defined in claim 7 wherein said referencing plate has a boundary edge located adjacent the printing region.

9. A printer as defined in claim 8 wherein said leaf spring has a free edge substantially coextensive with said boundary edge of said referencing plate, and said leaf spring is mounted to permit resilient movement of said free edge of said leaf spring transversely to said reference surface.

10. A printer as defined in claim 9 wherein said leaf spring is folded over at its said free edge.

11. A printer as defined in claim 1 wherein the printing device is of the type which utilizes solid ink or phase change ink.

* * * * *